United States Patent [19]

Collins

[11] 4,377,658

[45] Mar. 22, 1983

[54] SOLVENT RESISTANT POLYMERIC COMPOSITION

[75] Inventor: James H. Collins, Houston, Tex.

[73] Assignee: Shell Oil Company, Houston, Tex.

[21] Appl. No.: 341,963

[22] Filed: Jan. 22, 1982

[51] Int. Cl.$^3$ .................... A43B 13/04; C08K 3/26; C08K 3/36; C08L 53/02
[52] U.S. Cl. ................................. 524/425; 524/505; 525/95; 525/98; 525/99
[58] Field of Search ............... 523/167, 150; 524/425, 524/505; 525/98, 95, 99

[56] References Cited

U.S. PATENT DOCUMENTS 3,614,836  10/1971  Snyder et al. ............... 523/167
4,216,131  8/1980   Himes et al. ............... 523/167
4,216,132  8/1980   Zweig et al. ............... 523/167

Primary Examiner—Allan Lieberman

[57] ABSTRACT

A polymeric composition having improved resistance to environmental flex cracking, solvent attack, abrasion and ozone attack comprises the blend of two different radial monoalkenyl arene-conjugated diene block copolymers, high density polyethylene, ethylene-vinyl acetate copolymer, hydrocarbon extending oil, polystyrene resin and filler.

7 Claims, No Drawings

SOLVENT RESISTANT POLYMERIC COMPOSITION

BACKGROUND OF THE INVENTION

1. Field of the Invention

The invention relates to a polymeric composition having improved resistance to environmental flex cracking, solvent attack, abrasion and ozone attack. More particularly, the invention relates to a polymeric composition containing radial monoalkenyl arene conjugated diene block copolymers and an ethylene-vinyl acetate copolymer along with various other components.

2. Description of the Prior Art

The use of certain block copolymers and their compounds in a number of end-uses and especially footwear, is rapidly expanding. For example, in the footwear industry, certain block copolymer compounds are being used in large volume in the manufacture of a wide variety of shoes including canvas shoes, sport shoes, and dress shoes. The block copolymers may be utilized for this purpose for soling, foxing, innersoles and the like. These compositions are disclosed in Hendricks et al, U.S. Pat. No. Re. 28,236. In general, these shoe component compositions usually comprise a mixture of block copolymer, extending oil, polystyrene and possibly a filler.

For the most part, these block copolymer compositions have proven to be particularly advantageous in many respects, including flexibility, processability, lack of vulcanization requirement and wet slip. However, in certain respects, shortcomings have been noted. For example, commercial compounds should be free from delamination and free from elephant hide. For some important commercial applications, it is also important that the shoe soles also possess solvent resistance and oil resistance. Improved footwear compositions have been made, such as those compositions disclosed in U.S. Pat. Nos. 4,216,131 and 4,216,132. However, the prior art compositions still do not possess sufficient solvent resistance. A novel composition with unexpectedly improved properties has now been found.

SUMMARY OF THE INVENTION

The present invention deals with novel footwear compositions having a superior balance of properties. Specifically, the present invention is a polymeric composition having improved resistance to environmental flex cracking, solvent attack, abrasion and ozone attack comprising:

(a) 100 parts by weight of a block copolymer component selected from the group consisting of:
  (i) a mixture of radial $(AB)_x BA$ first block copolymer and a radial $(A'B')_y B'A'$ second block copolymer where x and y are greater than 1, the weight ratio of first block copolymer to second block copolymer is between about 20:80 and about 90:10, each block A being a monoalkenyl arene polymer block having an average molecular weight between about 20,000 and about 40,000, each block B being an elastomeric conjugated diene polymer block having an average molecular weight between about 15,000 and about 300,000, the blocks A comprising about 40 to about 55 percent by weight of said first block copolymer, each block A' being a monoalkenyl arene polymer having an average molecular weight between about 5,000 and about 30,000, each block B' being an elastomeric conjugated diene polymer block having an average molecular weight between about 15,000 and about 300,000, the blocks A' comprising about 20 to 40 percent by weight of said second block copolymer;
  (ii) a radial $(CD)_z DC$ third block copolymer where z is greater than 1, each block C being a monoalkenyl arene polymer block having an average molecular weight between about 15,000 and about 25,000, each block D being an elastomeric conjugated diene polymer block having an average molecular weight between about 15,000 and about 300,000, the blocks C comprising between about 35 and about 45 percent by weight of said third block copolymer; and
  (iii) mixtures of (i) and (ii);
(b) about 0 to about 50 parts by weight of a high density polyethylene having a melt flow index at 190° C. between about 0.1 and about 30 and a specific gravity above 0.94;
(c) about 20 to about 100 parts by weight of an ethylene-vinyl acetate copolymer having a melt flow index at 190° C. between about 0.1 and about 8;
(d) about 0 to about 200 parts by weight of a hydrocarbon rubber extending oil;
(e) about 0 to about 50 parts by weight of a polystyrene resin; and
(f) about 0 to about 200 parts by weight of a finely divided filler.

As shown in the illustrative embodiments which follow, the compositions according to the present invention have an environmental flex crack resistance far exceeding the prior art blends. Further, the present compositions are resistant to ozone cracking and have an improved abrasion resistance.

DETAILED DESCRIPTION OF THE INVENTION

The block copolymer component of the present invention is either a mixture of two different radial block copolymers or a specific single radial block copolymer. The first block copolymer is a radial $(AB)_x BA$ block copolymer, where x is greater than 1. The second block copolymer is a radial $(A'B')_y B'A'$ block copolymer where y is greater than 1. The third block copolymer, which may be employed as the only block copolymer component, is a radial $(CD)_z DC$ block copolymer where z is greater than 1. Preferably, x, y and z vary from over 1 to 15, more preferably from about 2 to about 6.

The A, A' and C blocks are monoalkenyl arene polymer blocks and the B, B' and D blocks are elastomeric conjugated diene polymer blocks. A typical radial polymer would comprise one in which the diene block has three or more branches, the tip of each branch being connected to a polystyrene block. See U.S. Pat. No. 3,594,452. Other useful monoalkenyl arenes from which the thermoplastic (non-elastomeric) blocks may be formed include alphamethyl styrenes as well as mixtures of the same. The conjugated diene monomer preferably has 4 to 5 carbon atoms, such as butadiene and isoprene with butadiene being most preferred.

When two different radial block copolymers are employed, the weight ratio of first block copolymer to second block copolymer is between about 20:80 and about 90:10, preferably between about 40:60 and about 60:40.

The average molecular weight of each of the blocks in the block copolymer may be varied within the ranges specified below.

Regarding the first block copolymer, the monoalkenyl arene polymer A blocks preferably have number average molecular weights between about 20,000 and about 40,000, more preferably between about 22,000 and about 30,000. The elastomeric conjugated diene polymer B blocks preferably have number average molecular weights between about 15,000 and about 300,000, more preferably between about 25,000 and about 50,000. The average molecular weights of the polystyrene end blocks are determined by gel permeation chromatography, whereas the polystyrene content of the polymer is measured by infrared spectroscopy of the finished block polymer. The weight percentage of the thermoplastic monoalkenyl arene blocks in the finished first block polymer should be between about 40 and 55%, preferably between about 40% and about 50% by weight. The general type and preparation of these block copolymers are described in U.S. Pat. No. Re. 28,246 and in many other U.S. and foreign patents.

Regarding the second block copolymer, the monoalkenyl arene polymer A' blocks preferably have number average molecular weights between about 5,000 and about 30,000, more preferably between about 15,000 and about 25,000. The elastomeric conjugated diene polymer B' blocks preferably have number average molecular weights between about 15,000 and about 300,000, more preferably between about 25,000 and about 70,000. The weight percentage of the thermoplastic monoalkenyl arene A' blocks in the finished second block polymer should be between about 20% and 40%, preferably between about 25% and about 35% by weight.

Regarding the third block copolymer, the monoalkenyl arene polymer C blocks preferably have number average molecular weights between about 15,000 and about 25,000, more preferably between about 17,000 and about 23,000. The elastomeric conjugated diene polymer D blocks preferably have number average molecular weights between about 15,000 and about 300,000, more preferably between about 15,000 and about 50,000. The weight percentage of the thermoplastic monoalkenyl arene C blocks in the finished third block polymer should be between about 35% and 45%, preferably between about 37 and about 43% by weight.

The high density polyethylenes useful herein should have melt indices between about 0.1 and 30 and a density greater than about 0.94 grams per cubic centimeter (g/cm$^3$). Typical high density polyethylenes (HDPE) have densities of around 0.95 to 0.96, a crystalline melting point of over about 130° C., and a molecular weight of between about 40,000 and 1,000,000. Melt index is important in that it relates to the viscosity characteristics of the polyethylene.

The process by which these polyethylenes are prepared does not form a part of the present invention. They may, in fact, be prepared by any of the well-known methods such as those described in the book "Polyethylene" by Raff and Allison, Interscience Publishers (1956). See also the Kirk-Othmer Encyclopedia of Science and Technology, Volume 14, pages 242-282 (2nd ed. 1967).

The amount of polyethylene employed varies from about 0 phr (parts by weight per hundred parts by weight rubber, or block copolymer component as in this case) to about 50 phr, preferably 5 phr.

The ethylene-vinyl acetate copolymers which may be used in the compositions of the invention correspond to the general formula

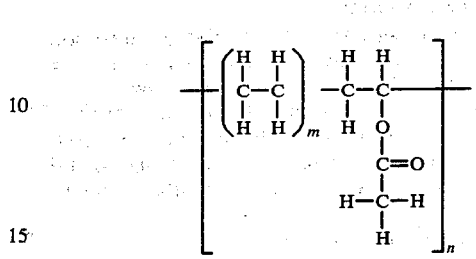

wherein n ranges from about 15 to about 250. The actual occurence of the acetate substituents along the hydrocarbon chain is of a random character and thus the letter m denotes the average number of ethylene units per vinyl acetate unit in the molecule rather than the presence of regularly recurrent units having the composition given within the above brackets. The value for m ranges from about 6.5 to 40 and preferably from 7.5 to 30. The latter values for m correspond to a vinyl acetate content in the copolymer of approximately 29 to 9% by weight, respectively. The useful melt indices range from about 0.1 to about 8 grams per 10 minutes.

The amount of ethylene-vinyl acetate copolymer employed in the present composition ranges from about 20 to about 100 phr, preferably between about 35 and about 55 phr. As with the polyethylene, it is preferable that the viscosity of the ethylene-vinyl acetate copolymer be matched with that of the polyethylene and the block copolymer components.

Another component of the present invention is a polystyrene resin. As used in the specification and claims, the term "polystyrene resin" includes crystal polystyrene, high impact polystyrene, medium impact polystyrene and poly (alpha-methylstyrene). The amount of polystyrene resin employed varies from about 0 phr to about 50 phr, preferably between about 5 phr and about 30 phr.

The hydrocarbon rubber extending oils, usually referred to as paraffinic/naphthenic oils, are usually fractions of refined petroleum products having less than about 30% by weight of aromatics (by clay-gel analysis) and usually have viscosities between about 100 and 500 SSU at 100° F. Commercial extending oils include SHELLFLEX ® oils, Nos. 310, 371 and 311 (which is a blend of 310 and 371). The amount of extending oil employed varies from about 0 to about 200 phr, preferably from about 25 to about 160 phr.

The fillers which may be used in the present compositions are well known in the art and include clay, talc, silica, titanium dioxide, carbon blacks, calcium carbonate, and other pigments as well as fibrous fillers such as cellulosic, polyester or acrylic fibers, sawdust, ground cork, etc. Preferred fillers include silica and calcium carbonate. The amount of filler employed varies from 0 to 200 phr, preferably 10 to about 60 phr. Additional minor amounts of antioxidants, ultraviolet stabilizers and the like may also be added.

The components of this invention may be combined by processes known in the art including blending such as by extrusion, Banbury mixing or by dry-blending procedures. In the latter case, it is preferred that the block copolymer and other polymers be formed or ground in particles having an average size less than about 4 millimeter diameter onto which the extending oil is absorbed. Following this, the remaining powdered components may be added and vigorously dry-blended therewith such as in well-known dry-blending equipment long used in the PVC dry-blending art. Preferably, however, the various components are melt blended.

While the present specification emphasizes the use of these compositions in footwear components, other end-uses also are contemplated. These include, for example, automotive parts and wire and cable coatings. Tubular products such as hoses and the like also are contemplated.

The use of the present composition in footwear includes especially their use in soling when prepared by injection molding and slab soling, such as produced by cutting shoe sole forms from extruded slabstock. The advantages of the present compositions are most apparent in injection molding of unit soles which are later attached by adhesion or sewing to uppers. These unit soles (which term refers in the trade to a sole including an integral heel portion) are useful both as a leather replacement and as an improvement over the prior art vinyl soles. The compositions also may be used in the manufacture of injection molded canvas shoe soles wherein the soling is directly injection molded onto the canvas upper which may be canvas or various natural and synthetic fibers, including leather, vinyl and polymeric materials. In some cases precoating of the upper with a primer is required to effect adhesion.

The invention is further illustrated by means of the following illustrative embodiment, which is given for the purpose of illustration alone and is not meant to limit the invention to the particular reactants and amounts disclosed.

ILLUSTRATIVE EMBODIMENT I

In Illustrative Embodiment I, seven different compositions were prepared—three outside the scope of the invention and four within the scope of the invention. The various components are described below:

| Component | Description |
|---|---|
| Block Copolymer #1 | A linear styrene-butadiene-styrene block copolymer. |
| Block Copolymer #2 | A radial styrene-butadiene-block copolymer having a structure $(S-B)_yB-S$ where y averages about 2.5 and which has a molecular weight distribution according to the invention ("first block copolymer" component). |
| Block Copolymer #3 | A radial styrene-butadiene block copolymer similar to Block Copolymer #2. |
| Block Copolymer #4 | A radial styrene-butadiene block copolymer having a structure $(S-B)_xB-S$ where x averages about 2.5 and has a molecular weight distribution according to the invention ("second block copolymer" component). |
| Block Copolymer #5 | A linear styrene-butadiene-styrene block copolymer. |
| Block Copolymer #6 | A radial styrene-butadiene block copolymer having a structure $(S-B)_zBS$ where z averages about 3.0 and has a molecular weight distribution according to the invention ("third block copolymer" component). |
| Oil | A hydrocarbon rubber extending oil. |
| Crystal Polystyrene | A free radical polymerized crystal-grade polystyrene. |
| EVA | An ethylene-vinyl acetate copolymer having a density of 0.94 g/cm$^3$ and a melt flow index of 0.3. |
| HDPE | A high density polyethylene having a melt flow index of 0.45 and a density of 0.95 g/cm$^3$. |
| Poly (AMS) | A poly (alpha-methylstyrene) resin. |

All components contained the same standard antioxidant-inhibitor package. Samples of the various compositions were tested according to the following tests:

| Test | Standard Test Number |
|---|---|
| Shore A Hardness | D-2240 |
| Tinius Olsen Stiffness | D-747 |
| Taber Abrasion | D-1044 |

The term "EFCR" stands for environmental fatique crack resistance and is measured by the Ross Flex Test, modified ASTM-1052, kilocycles to 500% cut growth. The sample thickness was 0.635 cm. In addition to the measurement of the standard EFCR without treatment (dry), EFCR was also examined on treated samples. EFCR, Igepal Treated, refers to treatment with an aqueous solution of 10% Igepal (a nonionic surfactant, nonylphenoxy poly (ethyleneoxy) ethanol), in the cut area every four hours. EFCR, Detergent Treated, refers to treatment with "Janitor in the Drum" type detergent formulation in the cut area every four hours. EFCR, Oil Treated, refers to treatment with soybean cooking oil, the sample being soaked for 48 hours at room temperature prior to flexing.

The various formulations and test results are presented below in Table I.

TABLE I

| | Composition Number | | | | | | |
|---|---|---|---|---|---|---|---|
| | #1 | #2 | #3 | #4 | #5 | #6 | #7 |
| A. COMPOSITION (Parts by Weight) | | | | | | | |
| According to the Invention? | No | No | No | Yes | Yes | Yes | Yes |
| Block Copolymer #1 | 100 | — | — | — | — | — | — |
| Block Copolymer #2 | — | — | — | — | 50 | 50 | — |
| Block Copolymer #3 | — | 91 | 91 | 50 | — | — | — |
| Block Copolymer #4 | — | 0 | 0 | 50 | 50 | 50 | — |
| Block Copolymer #5 | — | 9 | 9 | — | — | — | — |
| Block Copolymer #6 | — | — | — | — | — | — | 100 |
| Oil | 112 | 121 | 121 | 130 | 120 | 130 | 130 |

TABLE I-continued

| | | #1 | #2 | #3 | #4 | #5 | #6 | #7 |
|---|---|---|---|---|---|---|---|---|
| Silica Filler | | 27 | 25 | 25 | 25 | 25 | 25 | 25 |
| Crystal Polystryene | | 36 | 27 | — | — | — | — | — |
| EVA | | — | 18 | 18 | 43 | 43 | 43 | 43 |
| HDPE | | — | 0 | 0 | 5 | 5 | 5 | 5 |
| Poly (AMS) | | 17 | 17 | 17 | 17 | 17 | 17 | 17 |
| Poly (AMS) | | — | 9 | 9 | — | 9 | — | — |
| Additive Package | | 1.45 | 1.45 | 1.45 | 1.45 | 1.45 | 1.45 | 1.45 |
| Pigment Package | | — | 8.6148 | 8.6148 | 8.6148 | — | — | — |
| | Total | 293.45 | 327.0648 | 300.0648 | 330.0648 | 320.45 | 321.45 | 321.45 |
| B. PROPERTIES | | | | | | | | |
| Hardness (Rex, flex bar) | | 55 | 56 | 56 | 56 | 65 | 55 | 61 |
| Hardness, Shore A CM, 120° C. (Inst/10 sec) | | 48/45 | 52/46 | 53/47 | 55/50 | 65/57 | 55/49 | 66/60 |
| Melt Index (Cond. E) (g/10 min) | | 26 | 20 | 17 | 10 | 7.5 | 11.5 | 11.8 |
| Specific Gravity (calculated) | | 0.995 | 1.01 | 1.01 | 1.01 | 0.978 | 0.975 | — |
| Taber Abrasion Resistance (cc/kc) | | 0.89 | 0.89 | 0.94 | 0.69 | 0.62 | 0.73 | 0.72 |
| Tinius Olsen Stiffness, k Pa | | 6700 | 6080 | 6780 | 4260 | 6290 | 4500 | 6210 |
| (psi) | | (960) | (870) | (970) | (610) | (900) | (650) | (900) |
| Adhesion, KN/m | | 7.0 | 6.3 | 6.5 | 7.0 | 7.4 | 6.7 | — |
| (pli) | | (40) | (36) | (37) | (40) | (42) | (38) | — |
| Type Failure | | Cohesive | Cohesive | Cohesive | Cohesive | Cohesive | Cohesive | — |
| EFCR, dry (kc) | | 160 | 460 | 1,550 | >2,000 | 4,200 | 1,900 | 3,500 |
| EFCR, Igepal Treated (kc) | | 35 | 75 | 260 | 430 | >1,000 | 1,000 | 270 |
| EFCR, Detergent Treated (kc) | | 110 | 200 | >850 | >2,000 | >2,000 | NA | >2,400 |
| EFCR, Oil Treated (kc) | | 100 | 280 | 1,500 | >2,500 | >5,000 | >3,000 | >6,000 |
| Ozone Type cracking during flexing (dry) | | No | Yes | Yes | No | No | No | No |
| Trouser Tear, KN/m 11/1 | | 14/14 | 19/18 | 18/16 | NA | 18/16 | 16/14 | 20/19 |
| pli | | 80/80 | 110/100 | 100/90 | NA | 100/90 | 90/80 | 115/110 |
| Specific Gravity (natural) | | 0.999 | 0.989 | 0.983 | 0.975 | 0.978 | 0.975 | 0.975 |
| Pellets in Toluene | | Dissolve | Delaminate | Delaminate | Swell/No delamination | NA | NA | NA |

A comparison of the properties of the compounds in Table I shows remarkable enhancement of physical properties for compounds according to the invention.

What is claimed is:

1. A polymeric composition having improved resistance to environmental flex cracking solvent attack, abrasion and ozone attack consisting essentially of:
    (a) 100 parts by weight of a block copolymer component selected from the group consisting of:
        (i) a mixture of a radial (A B)$_x$BA first block copolymer and a radial (A' B')$_y$B'A' second block copolymer where x and y are greater than 1, the weight ratio of first block copolymer to second block copolymer is between about 20:80 and about 90:10, each block A being a monoalkenyl arene polymer block having a number average molecular weight between about 20,000 and about 40,000, each block B being an elastomeric conjugated diene polymer block having a number average molecular weight between about 15,000 and about 300,000, the blocks A comprising about 40 to about 55 percent by weight of said first block copolymer, each block A' being a monoalkenyl arene polymer having a number average molecular weight between about 5,000 and about 30,000, each block B' being an elastomeric conjugated diene polymer block having a number average molecular weight between about 15,000 and about 300,000, the blocks A' comprising about 20 to 40 percent by weight of said second block copolymer;
        (ii) a radial (CD)$_z$D C third block copolymer where z is greater than 1, each block C being a monoalkenyl arene polymer block having a number average molecular weight between about 15,000 and about 25,000, each block D being an elastomeric conjugated diene polymer block having a number average molecular weight between about 15,000 and about 300,000, the blocks C comprising between about 35 and about 45 percent by weight of said third block copolymer; and
        (iii) mixtures of (i) and (ii);
    (b) about 5 to about 50 parts by weight of a high density polyethylene having a melt flow index at 190° C. between about 0.1 and about 30 and a specific gravity above 0.94;
    (c) about 20 to about 100 parts by weight of an ethylene-vinyl acetate copolymer having a melt flow index at 190° C. between about 0.1 and about 8 and a general formula

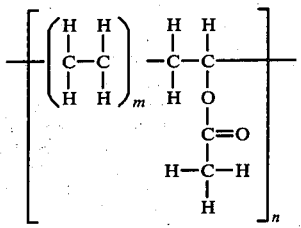

where n ranges from about 15 to about 250 and m ranges from about 6.5 to about 40;
    (d) about 25 to about 160 parts by weight of a hydrocarbn rubber extending oil;
    (e) about 5 to about 30 parts by weight of a polystyrene resin selected from the group consisting of crystal polystyrene, high impact polystyrene, medium impact polystyrene and poly(alpha-methylstyrene); and
    (f) about 10 to about 60 parts by weight of a finely divided filler.

2. The composition according to claim 1 wherein said A blocks, said A' blocks and said C blocks are polystyrene blocks while said B blocks, said B' blocks and said D blocks are polybutadiene blocks.

3. A composition according to claim 1 wherein the ethylene-vinyl acetate copolymer has a melt flow index of about 0.3 grams per 10 minutes and a vinyl acetate content of about 13%.

4. The composition according to claim 1 or claim 3 wherein said polyethylene has a melt flow index of about 0.45 and a specific gravity of 0.95.

5. The composition according to claim 1 wherein said polystyrene resin is a poly (alpha-methylstyrene) resin.

6. The composition according to claim 1 wherein said filler is selected from the groups consists of calcium carbonate and silica.

7. A shoe sole having the composition of claim 1.

* * * * *